(12) United States Patent
Lee et al.

(10) Patent No.: US 7,859,824 B2
(45) Date of Patent: Dec. 28, 2010

(54) SOLID CAPACITOR AND MANUFACTURING METHOD THEREOF

(75) Inventors: Shang Mei Lee, Wugu Township, Taipei County (TW); Ting Keng Lin, Wugu Township, Taipei County (TW); Yung Sheng Huang, Wugu Township, Taipei County (TW)

(73) Assignee: CTECH Corporation, Taipei County (TW)

( * ) Notice: Subject to any disclaimer, the term of this patent is extended or adjusted under 35 U.S.C. 154(b) by 322 days.

(21) Appl. No.: 12/071,296

(22) Filed: Feb. 20, 2008

(65) Prior Publication Data

US 2008/0198533 A1    Aug. 21, 2008

Related U.S. Application Data

(62) Division of application No. 11/274,129, filed on Nov. 16, 2005, now Pat. No. 7,495,891.

(30) Foreign Application Priority Data

Sep. 16, 2005    (TW) .............................. 94132142 A

(51) Int. Cl.
*H01G 9/025*    (2006.01)
(52) U.S. Cl. ........................ 361/325; 361/516; 361/519; 361/523; 361/528; 361/529

(58) Field of Classification Search ................. 361/502, 361/503–504, 508–512, 516–519, 523–529, 361/540–541
See application file for complete search history.

(56) References Cited

U.S. PATENT DOCUMENTS

| | | | | |
|---|---|---|---|---|
| 4,370,697 A | * | 1/1983 | Haberl et al. | 361/283.1 |
| 4,683,639 A | * | 8/1987 | Maesaka et al. | 29/25.03 |
| 5,849,025 A | * | 12/1998 | Owens et al. | 607/5 |
| 6,097,587 A | * | 8/2000 | Inagawa et al. | 361/502 |
| 6,680,841 B2 | * | 1/2004 | Tadanobu et al. | 361/523 |
| 7,031,141 B2 | * | 4/2006 | Kuriyama | 361/528 |
| 7,375,608 B2 | * | 5/2008 | Suzuki et al. | 336/200 |

* cited by examiner

*Primary Examiner*—Nguyen T Ha
(74) *Attorney, Agent, or Firm*—Rosenberg, Klein & Lee

(57) ABSTRACT

A solid capacitor and the manufacturing method thereof are disclosed. The solid capacitor consists of a dielectric layer and two electrodes. A plurality of holes formed by an opening process is disposed on surface of the dielectric layer. The two electrodes connect with the dielectric layer by the holes. By means of a plurality of high temperature volatile matters, the plurality of holes is formed on surface of the dielectric layer during sintered process. The holes are connected with the outside so as to increase surface area of the dielectric layer and further the capacity is increased. And the solid capacitor stores charge by physical means. Moreover, the solid capacitor can be stacked repeatedly to become a multilayer capacitor.

11 Claims, 7 Drawing Sheets

10

SOLID CAPACITOR AND MANUFACTURING METHOD THEREOF

RELATED APPLICATIONS

This application is a Divisional patent application of application Ser. No. 11/274,129, filed on 16 Nov. 2005, now U.S. Pat. No. 7,495,891.

BACKGROUND OF THE INVENTION

The present invention relates to a capacitor, especially to a solid capacitor that increases the capacity by means of larger surface area of the dielectric layer thereof. Moreover, the solid capacitor in accordance with the present invention can be stacked repeatedly so as to form a multilayer capacitor.

A capacitor is an energy storage component applied in circuits for tuning, filtering, coupling, by-pass, energy conversion and delay. Most common used capacitors are electrolytic capacitors, mica capacitors, ceramic capacitors and vitreous-enamel capacitor. The names refer to the type of dielectric that is used within the capacitor.

| capacitor types | structure and features |
|---|---|
| aluminum electrolytic capacitor | An aluminum cylinder works as a cathode with liquid electrolyte therein and a curved aluminum piece is used as an anode. The flow of direct current causes an insulating metal oxide to grow out of and into the surface of the anode. The metal oxide is used as dielectric. The advantage of electrolytic capacitors is the high capacity per unit volume. The disadvantage of electrolytic capacitors is the non-ideal, lossy characteristics and poor stability. It is used for signal coupling. In usage, please note that the voltage should not be applied in the reverse direction. |
| paper capacitor | Two metal foils as electrodes are clipped on insulated paper and the assembly can be rolled up to form a cylinder that is enclosed inside a metal housing or insulated material such as sealing wax, ceramic or vitreous-enamel. The package is smaller with higher capacitance. Due to high inherent inductance and loss of capacitor, the device is suitable for being applied to low frequency circuit. |
| metallized paper capacitor | The device basically has the same structure with paper capacitors while a metal membrane is used instead of metal foil. Its features are small volume and higher capacitance, generally applied to low-frequency circuit. |
| oil impregnated paper capacitor | By impregnating the paper with special oil, tolerance of the capacitor is improved. It features on high capacity and wide tolerance. However, the volume of the device is quite large. |
| vitreous-enamel capacitor | The dielectric material is vitreous-enamel. It has advantages of ceramic capacitors while the volume is smaller. It withstands high temperature. |
| ceramic capacitor | The dielectric is ceramic and the plates are made from ceramic base with silver membrane. Its features are small volume, good thermostability, higher insulation resistance but low capacity. Thus it is used for high frequency circuit. The ferroelectric ceramic capacitor has higher capacity while the loss and temperature coefficient are higher. Thus it is applied to low frequency circuit. |
| film capacitor | This capacitor has the same structure with the paper capacitor. The dielectric of the capacitor is polyester or polystyrene. The polyester capacitor has higher dielectric constant, small volume, high capacity, and good stability thus is suitable for bypass capacitors. While the polystyrene capacitor has small loss, high insulation resistance but high temperature coefficient. This capacitor is suitable for high frequency circuit. |
| mica capacitor | The silver electrodes or metal foil are plated directly onto the mica dielectric. Several layers of electrodes and mica are laminated and then are cast inside the phenolic resin or sealed inside the epoxy. Its properties are low loss of dielectric, high insulation resistance, low temperature coefficient and it is suitable for high frequency circuit. |
| tantalum or niobium electrolytic capacitor | Tantalum or niobium is used as positive electrode and diluted sulfuric acid works as negative electrode while dielectric is oxide membrane on surface of the tantalum or niobium. It has small volume, high capacity, stable performance, long life, high insulation resistance, and good thermostability. Thus it is applied to equipments with higher requirements of capacitors. |
| semi-variable capacitor | It's also called trimmer capacitor. The device consists of two pieces or two sets of metal spring with dielectric therebetween. The distance or area between two metal springs changes while tuning. The dielectric can be air, ceramic, mica or membrane. |
| variable capacitor | It is constructed by a set of immobile plates called stator, and another set of plates, connected to a common axis, called rotor and its capacity changes according to rotation of the rotor. The two-fold capacitors are two capacitors whose rotors share the common axis. The dielectric of such capacitor can be air or polystyrene. Capacitors with air dielectric with features of large volume and small loss are used in the electron tube radios. The variable capacitor with polystyrene dielectric is a compact sealed capacitor, mostly used in the transistor radio. |

Solid capacitors with dielectric layer made from ceramic material with high dielectric constant have features of environmental protection, low impedance, high thermostability, withstanding high ripple current and high reliability. Compared with traditional electrolytic capacitors, solid capacitors have higher stability thus explosion may occur less frequently.

The most common solid capacitor is multilayer ceramic capacitor (MLCC) manufactured by suspending ceramic powders in liquid and casting into a thin green sheet with thickness from 20 um to 5 um or even thinner. Then metal electrodes are sieved (screen) printed onto the sheets which are later stacked with sheets without electrodes alternately to form a laminated structure. After being sintered at high temperature, the device becomes a ceramic sinter that provides an extremely high capacity in a small volume. At last, surface of silver terminal electrode is plated with nickel, tin and lead and then the multilayer ceramic is soldered directly onto the printed circuit board.

The present invention provides a solid capacitor that improves disadvantages of electrolytic capacitors and increases capacity.

SUMMARY OF THE INVENTION

It is therefore a primary object of the present invention to provide a solid capacitor and the manufacturing method thereof. The capacitor includes a dielectric layer with a plurality of holes on surface thereof and two electrodes arranged on two sides of the dielectric layer respectively. The electrodes contact the holes. Due to the plurality of holes on surface of the dielectric layer, the surface area of the dielectric layer is increased so that the capacity of the solid capacitor is improved.

It is another object of the present invention to provide a solid capacitor and the manufacturing method thereof. While manufacturing the capacitor, a plurality of high temperature volatile matters is mixed on surface of the dielectric layer and part of the high temperature volatile matters is vapored or volatilized during sintering process of the dielectric layer so as to form a plurality of holes on surface of the dielectric layer. Thus the surface area of the dielectric layer is increased and the capacity of the solid capacitor is also getting higher.

It is a further object of the present invention to provide a solid capacitor and the manufacturing method thereof that generate a multilayer capacitor by stacking the capacitor repeatedly so as to increase the capacity.

In order to achieve above objects, a solid capacitor and a manufacturing method thereof are disclosed. The solid capacitor is composed by a dielectric layer and two electrodes. A plurality of holes formed by an opening process is disposed on surface of the dielectric layer. The two electrodes are connected with the dielectric layer through the holes. Due to the enlarged surface area of the dielectric layer, the capacity of the capacitor is increased. The solid capacitor stores charge by physical means.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figures 1A, 1B:
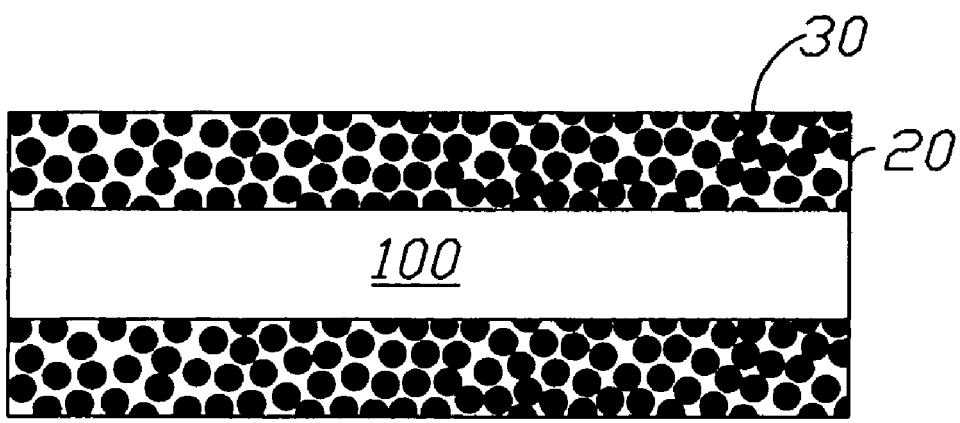
FIG. 1A to FIG. 1D are schematic drawings showing structure of an embodiment in accordance with the present invention.

The present invention provides a solid capacitor for improving disadvantages of conventional capacitors such as easily explosions and environmental pollutions by means of larger surface area for increasing stored charge. And the solid capacitor is a device that stores the capacity of a physical system.

Refer from FIG. 1A to FIG. 1D, structure of a solid capacitor 1 in accordance with the present invention is disclosed. In the beginning, a dielectric green tape 10 is sintered into a dense dielectric layer 100. The temperature for sintering ranges from 600 degrees Celsius to 1700 degrees Celsius. Then two sides of the dense dielectric layer 100 are coated with a plurality of dielectric 20 that is mixture of a plurality of high temperature volatile matter 30 or a plurality of conductive objects. The dense dielectric layer 100 and the dielectric 20 are sintered at an operating temperature of 300 to 1700 degrees so as to make the dielectric 20 form a loose dielectric layer 200. After the high temperature volatile matter 30 being volatilized, a plurality of holes 300 connected with the outside are formed on surface of tow sides of the loose dielectric layer 200. The diameter or width of the hole 300 is between 1 nm~100 μm while the range of 10 nm~10 μm is preferred. And the best range is from 5 nm to 50 μm. Therefore, the loose dielectric layer 200 with large surface area is formed. Moreover, two sides of the loose dielectric layer 200 are connected with two electrodes 400 respectively through the holes 300. The electrodes 400 are formed on surface of the loose dielectric layer 200 by one of electroplating, electroless plating, sputtering, spin-coating, coating, printing and chemical vapor deposition (CVD) or by combinations of above techniques.

The density ratio of the loose dielectric layer 200 and the dense dielectric layer 100 ranges from 0.05 to 0.95 while the range between 0.1 and 0.9 is preferred and the best ratio ranges from 0.15 to 0.85. The material of the dielectric 20 and the dielectric green tape 10 can be the same or different. The material is selected from ceramic dielectric layer, high molecular dielectric layer, and glass dielectric layer or various combinations of above material.

The holes 300 are formed on the loose dielectric layer 200, the holes 300 are connected to the outside, not the holes inside the loose dielectric layer 200 without contact the outside. Moreover, once the dielectric 20 having the high temperature volatile matter 30, the high temperature volatile matter 30 can be carbon, organics or their combinations. After being sintered, the holes 300 of the loose dielectric layer 200 is coated with the conductive object 500, as shown in FIG. 1E. The conductive object 500 can be carbon that works as an electrical connection between the electrodes 400 and the loose dielectric layer 200. The solid capacitor according to the present invention stores charge by physical means.

Figure 1C:
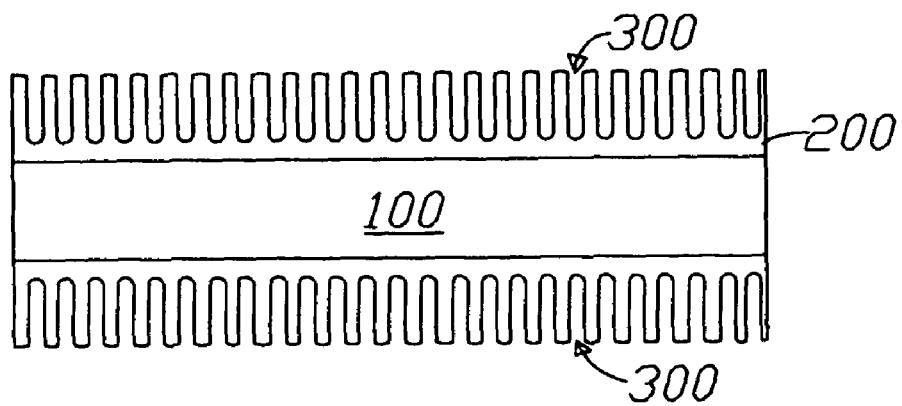
Figure 1D:
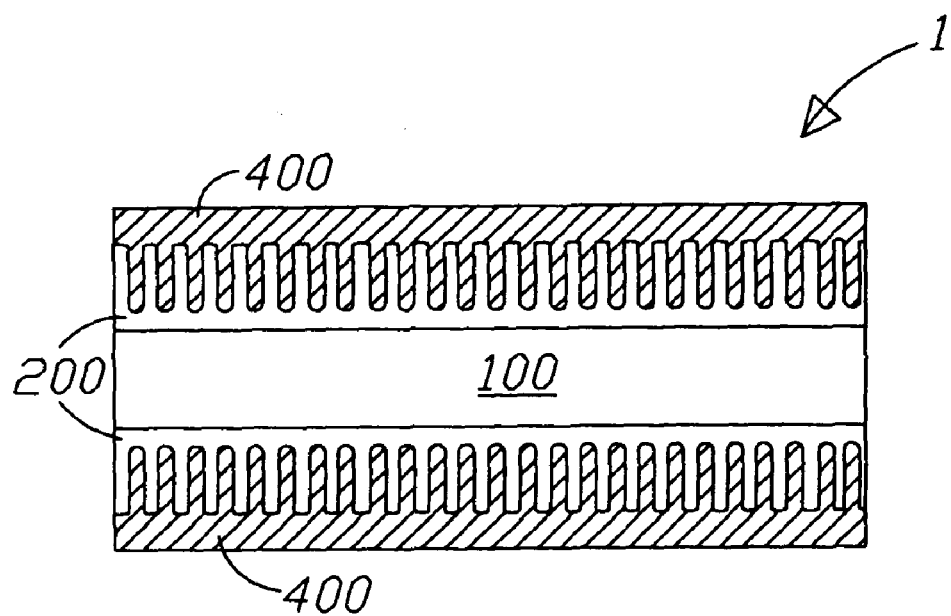
Figure 1E:
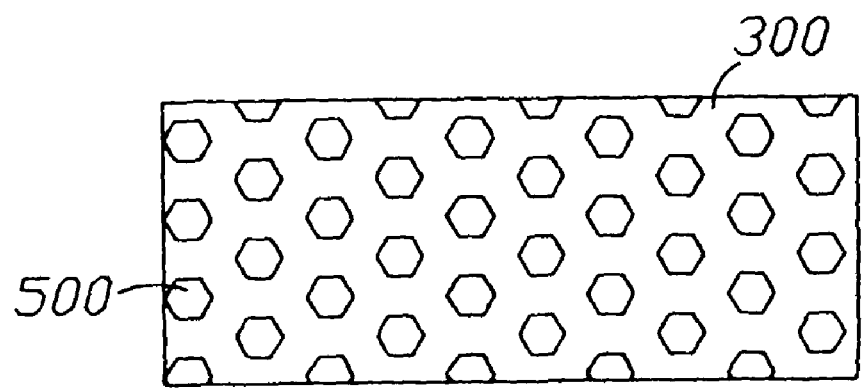
FIG. 1E is a schematic top view showing an embodiment of the present invention with holes coated with conductive object.
Figure 2:
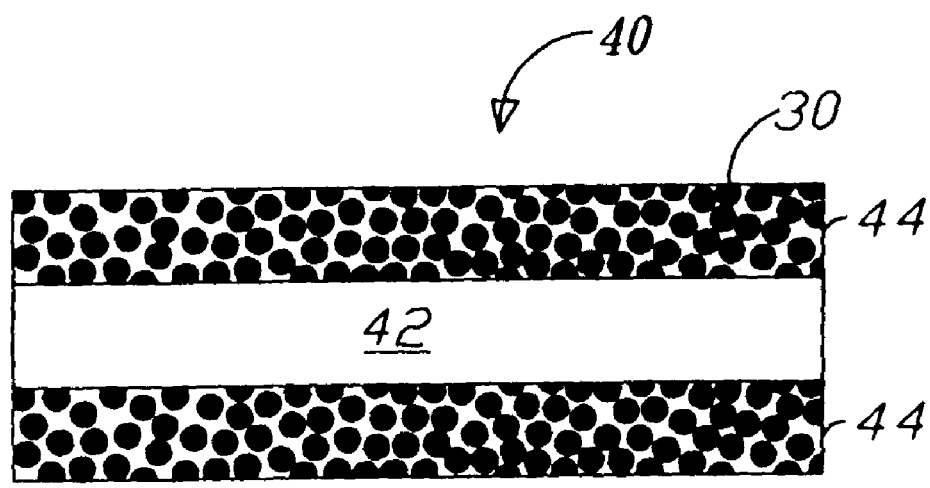
FIG. 2 is a schematic drawing showing structure of another embodiment in accordance with the present invention.

Furthermore, refer to FIG. 2 & FIG. 1C, the present invention further provides another manufacturing method to produce the solid capacitor. At first, a dielectric green tape 40 including a first dielectric layer 42 and two second dielectric layers 44 is formed. The two second dielectric layers 44 mixed with a plurality of high temperature volatile matter 30 or a plurality of conductive objects are disposed on two sides of the first dielectric layer 42. The dielectric green tape 40 is sintered so as to make the first dielectric layer 42 become the dense dielectric layer 100. Also the high temperature volatile matter 30 is volatilized to form the holes 300 so that the second dielectric layers 44 form the loose dielectric layers 200. The first dielectric layer 42 and the second dielectric layers 44 are sintered into dense and loose structure respectively due to different material they made from. The following manufacturing processes are the same with above descriptions.

Moreover, once the second dielectric layers 44 is mixed with the high temperature volatile matter 30, the high temperature volatile matter 30 can be carbon, organics or their combinations. After being sintered, the loose dielectric layer 200 is generated and the holes 300 thereon should be coated with the conductive object 500 for providing an electrical connection between the electrodes and the loose dielectric layers, as shown in FIG. 1E.

An embodiment is taking as an example for explanation of the present invention:

Experiment Group of the Present Invention:

Taking a dielectric green tape and press it under pressure of 100 Kg/cm$^2$, sintered at 1350 degrees Celsius, the operating time is 2 hours. Thus a dense dielectric layer is formed and two outer sides of the dense dielectric layer are coated with dielectric material and carbon fiber (C.F.) at the ratio of 300:1. After being dried at 70 degrees Celsius for 10 minutes, the invention is sintered at a temperature of 1350 degrees so as to form a loose dielectric layer with the thickness of 0.09 mm.

Control Group without the Loose Dielectric Layer:

The green tape is pressed under 100 Kg/cm$^2$, at a temperature of 1350 degrees Celsius, the operating time is 2 hours.

| Frequency (Hz) | Capacitance | |
|---|---|---|
| | Experimental group | Control group |
| 10K | 4805 | 1874 |
| 50K | 3480 | 1766 |
| 100K | 3137 | 1760 |
| 500K | 2781 | 1736 |
| 1000K | 2462 | 1650 |

Figure 3:
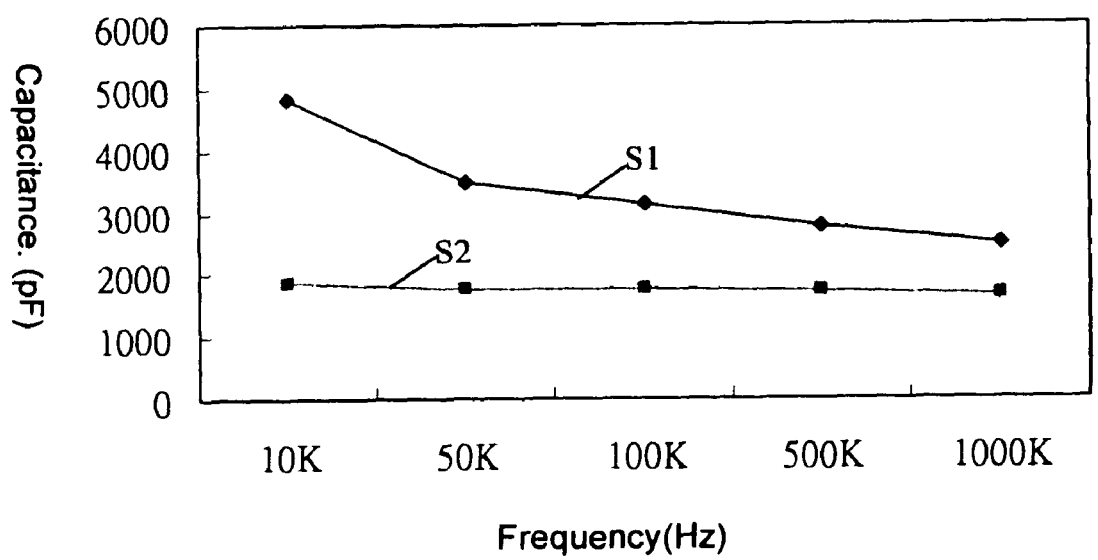
FIG. 3 is a curve chart showing capacity of capacitors with and without holes under different frequencies.

Refer to FIG. 3, the curves shows capacity of capacitors with or without holes under different frequencies respectively. As shown in figure, the first curve S1 and the secondary curve S2 represent capacity of capacitors with and without holes respectively under different frequencies. Compared the curve S1 with the curve S2, it is obvious that the capacitor with holes has higher capacity than the capacitor without holes under different frequencies.

Figure 4A:
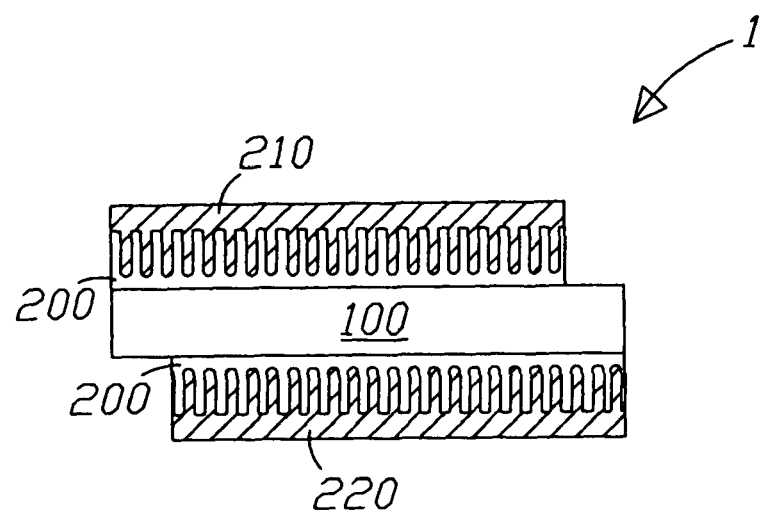
FIG. 4A to FIG. 4D are schematic drawings showing structure of a multilayer capacitor in accordance with the present invention.
Figure 4B:
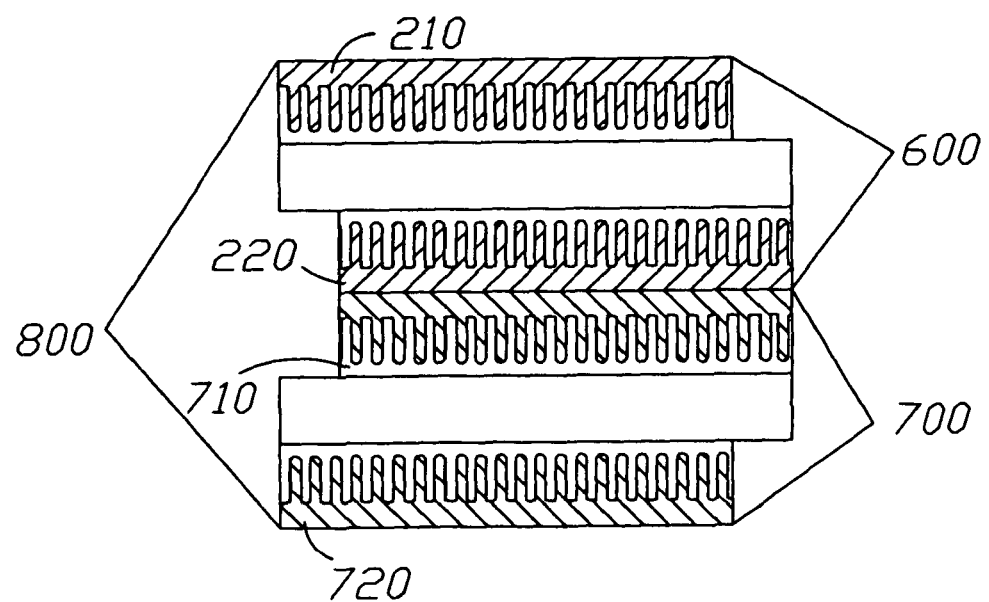
Figure 4C:
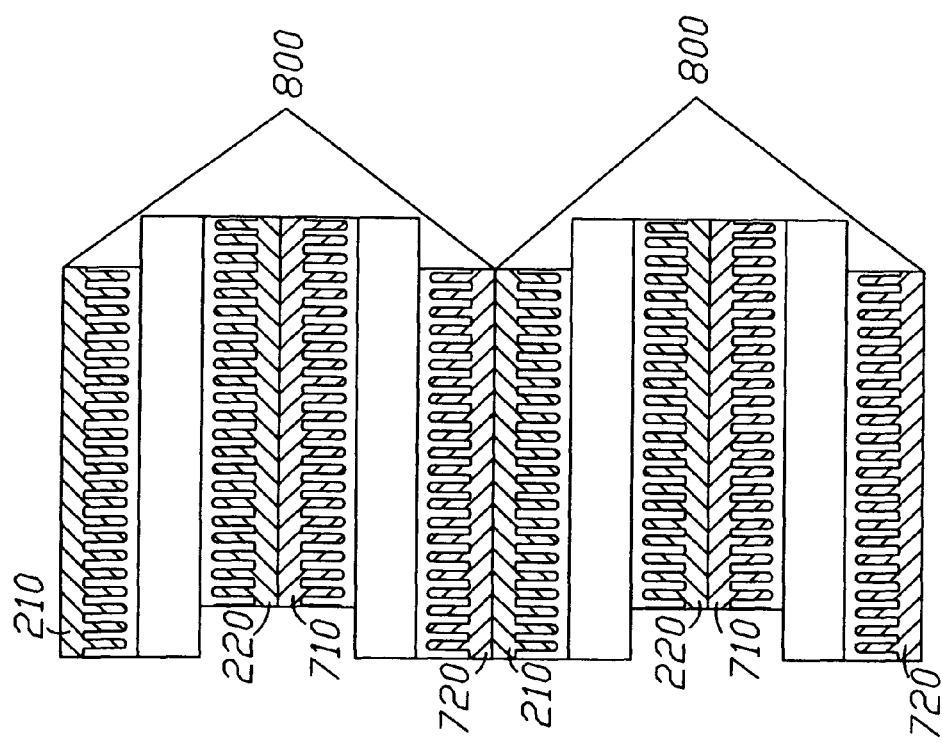
Figure 4D:
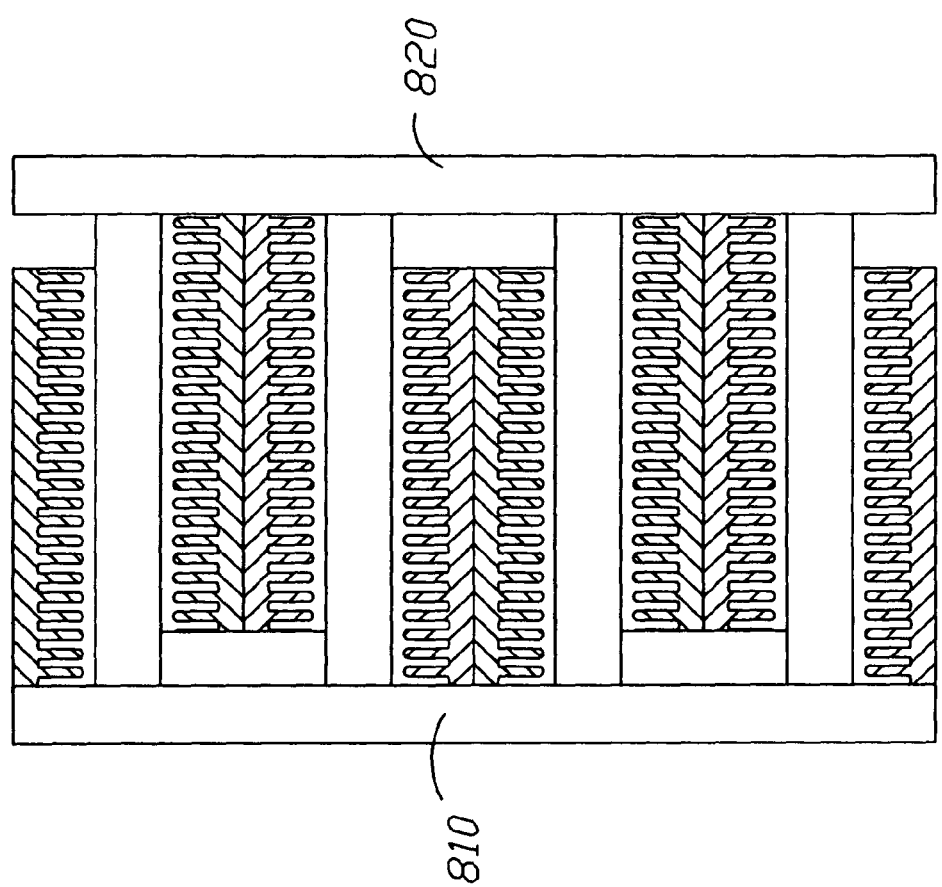

In addition, a solid capacitor according to the present invention can be a multilayer capacitor for demanding of higher capacity. As shown from FIG. 4A to FIG. 4D, firstly, the solid capacitor 1 in accordance with the present invention is manufactured as structure in FIG. 4A, the length of two loose dielectric layers 200 of the solid capacitor 1 are shorter than that of the dense dielectric layers 100 and a first electrode 210 as well as a second electrode 220 is disposed thereof. This is a basic unit. Then a first solid capacitor 600 is arranged on a second solid capacitor 700 reversely and the second electrode 220 is electrically connected with a third electrode 710 of the second solid capacitor 700, as shown in FIG. 4B. Thus a repeated unit 800 is formed.

Then the repeated units 800 are stacked repeatedly. A first outer electrode 810 and a second outer electrode 820 are arranged on two outsides. The first outer electrode 810 is electrically connected with the first electrode 210 and a fourth electrode 720 of the second dielectric layer while the second outer electrode 820 is electrically connected with the second electrode 220 and the third electrode 710 so as to form a multilayer capacitor.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A solid capacitor comprising:
   a dielectric layer portion having at least one dense dielectric layer and at least two loose dielectric layers on two outer sides of the dense dielectric layer;
   a plurality of holes communicating with the outside are formed by an opening process in each of the loose dielectric layers, the holes remaining thereby partitioned from the dense dielectric layer; and
   two electrodes arranged on two outer sides of the dielectric layer portion, the electrodes extending into the holes for engagement therewith.

2. The solid capacitor as claimed in claim 1, wherein the opening process for the holes is a sintering process.

3. The solid capacitor as claimed in claim 1, wherein ratio of the density of the loose dielectric layer to that of the dense dielectric layer ranges from 0.05 to 0.95.

4. The solid capacitor as claimed in claim 1, wherein ratio of the thickness of the respective loose dielectric layer to that of the dielectric layer portion ranges from 0.01 to 0.45.

5. The solid capacitor as claimed in claim 1, wherein ratio of the thickness of the dense dielectric layer to that of the dielectric layer ranges from 0.1 to 0.98.

6. The solid capacitor as claimed in claim 5, wherein diameter of the holes is from 0.01 nm to 10 μm.

7. The solid capacitor as claimed in claim 1, wherein the dielectric layer portion is mixed with a plurality of conductive objects.

8. The solid capacitor as claimed in claim 1, wherein surface of the holes is coated with a plurality of conductive objects.

9. The solid capacitor as claimed in claim 8, wherein the conductive object is carbon.

10. The solid capacitor as claimed in claim 7, wherein the conductive object is carbon.

11. The solid capacitor as claimed in claim 1, wherein the solid capacitor stores charge in a physical way by assembly of the two electrodes and the dielectric layer portion.

* * * * *